US012598090B2

(12) United States Patent (10) Patent No.: US 12,598,090 B2
Omorai et al. (45) Date of Patent: Apr. 7, 2026

(54) INFORMATION PROCESSING SYSTEM

(71) Applicant: No.1 Solutions Inc., Tokyo (JP)

(72) Inventors: Tetsuo Omorai, Tokyo (JP); Naota Takahashi, Tokyo (JP)

(73) Assignee: No. 1 Solutions Inc., Tokyo (JP)

( * ) Notice: Subject to any disclaimer, the term of this patent is extended or adjusted under 35 U.S.C. 154(b) by 75 days.

(21) Appl. No.: 18/645,371

(22) Filed: Apr. 25, 2024

(65) Prior Publication Data

US 2024/0348461 A1 Oct. 17, 2024

Related U.S. Application Data

(63) Continuation of application No. PCT/JP2022/040532, filed on Oct. 28, 2022.

(30) Foreign Application Priority Data

Oct. 28, 2021 (JP) ................................. 2021-176068

(51) Int. Cl.
*H04L 9/00* (2022.01)
*H04L 9/14* (2006.01)

(52) U.S. Cl.
CPC . *H04L 9/50* (2022.05); *H04L 9/14* (2013.01)

(58) Field of Classification Search
None
See application file for complete search history.

(56) References Cited

U.S. PATENT DOCUMENTS

| | | | | | |
|---|---|---|---|---|---|
| 2022/0207022 | A1* | 6/2022 | Wood | .................. | G06F 16/2379 |
| 2022/0209961 | A1* | 6/2022 | Wesch-Potente | ... | G06F 16/1824 |
| 2022/0405061 | A1* | 12/2022 | Jariwala | ................... | G06F 8/30 |

FOREIGN PATENT DOCUMENTS

| | | |
|---|---|---|
| JP | 2018-55203 A | 4/2018 |
| JP | 2020-190874 A | 11/2020 |
| WO | 2020/049656 A | 3/2020 |

OTHER PUBLICATIONS

Liang, W., Yang, Y., Yang, C., Hu, Y., Xie, S., Li, K.C. and Cao, J., 2022. PDPChain: A consortium blockchain-based privacy protection scheme for personal data. IEEE Transactions on Reliability, 72(2), pp. 586-598. (Year: 2022).*

(Continued)

*Primary Examiner* — Luu T Pham
*Assistant Examiner* — Edward X Long
(74) *Attorney, Agent, or Firm* — Yokoi & Co., U.S.A.; Toshiyuki Yokoi

(57) ABSTRACT

A personal blockchain generation unit 51 of a service providing server group 1 generates or updates a unit file containing a history of transaction of data change related to a predetermined unit such as an account and a data for a plurality of users in an account management service of virtual currencies or medical information management service. A finality transaction file generating unit 52 generates a file containing a content of the transaction when the transaction in which the predetermined user is involved for each of the transaction related to the predetermined unit is finished. A management control unit 53 performs a control for storing the unit file independently from the other units and managing the unit file separately from the other units file for each of the units in a predetermined service. At this time, the unit file is managed as a block of a blockchain.

4 Claims, 10 Drawing Sheets

(56) References Cited

OTHER PUBLICATIONS

Zyskind, G. and Nathan, O., May 2015. Decentralizing privacy: Using blockchain to protect personal data. In 2015 IEEE security and privacy workshops (pp. 180-184). IEEE. (Year: 2015).*
International Search Report for PCT/JP2022/040532 dated Jan. 24, 2023.
PCT written opinion dated Jan. 24, 2023.

* cited by examiner

Figure 3:
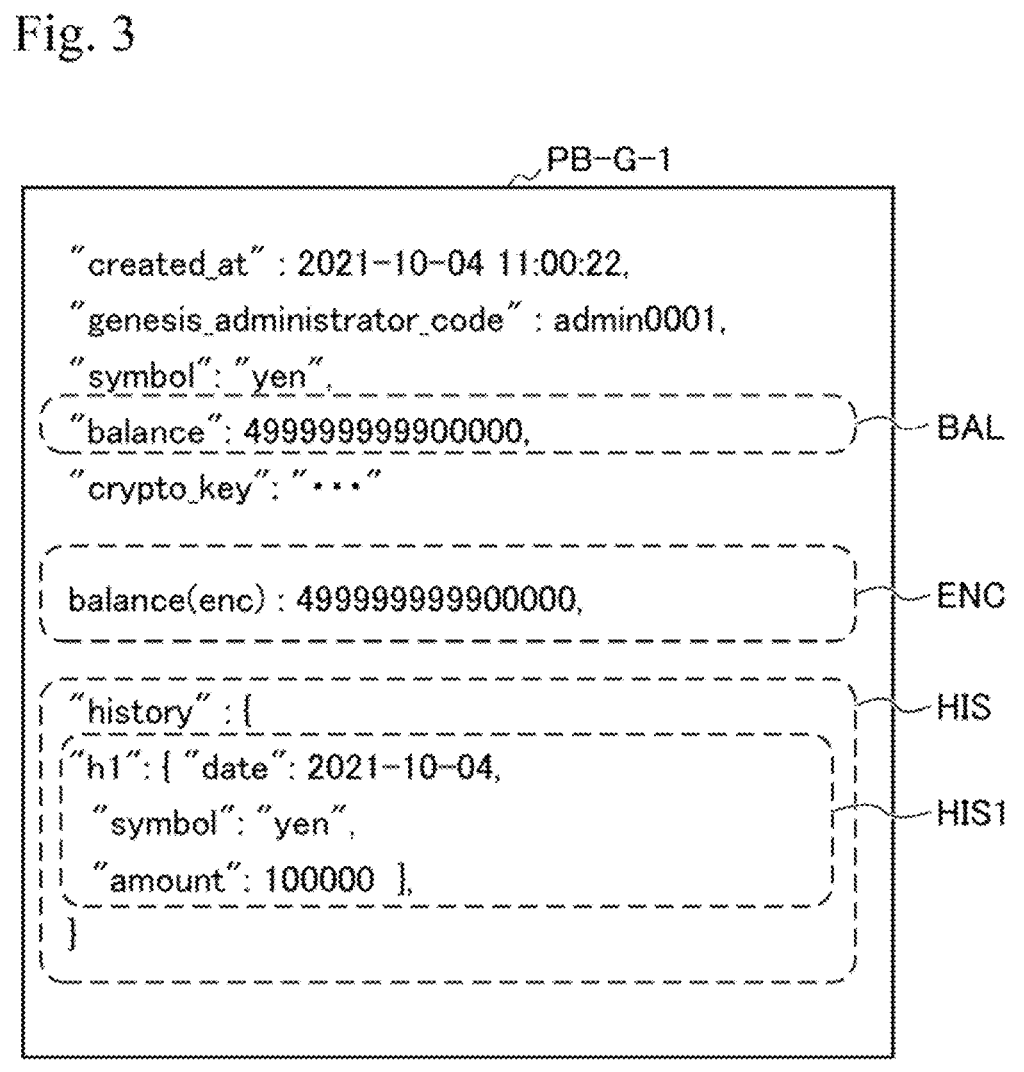

"created_at" : 2021-10-04 11:00:22,

"genesis_administrator_code" : admin0001,

"symbol" : "yen",

"balance" : 499999999900000,      — BAL

"crypto_key" : "・・・"

balance(enc) : 499999999900000,      — ENC

"history" : {      — HIS

"h1": { "date": 2021-10-04,

"symbol": "yen",      — HIS1

"amount": 100000 },

Figure 4:
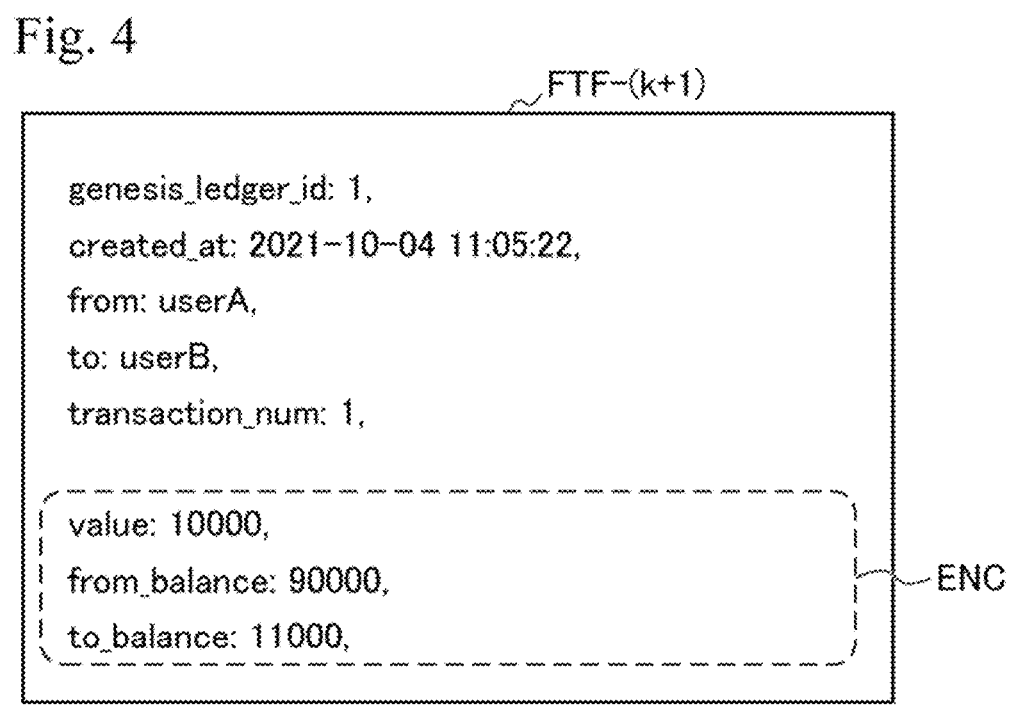

FTF~(k+1)

genesis_ledger_id: 1, created_at: 2021-10-04 11:05:22, from: userA, to: userB, transaction_num: 1, value: 10000, from_balance: 90000, to_balance: 11000,

ENC

Figure 5:
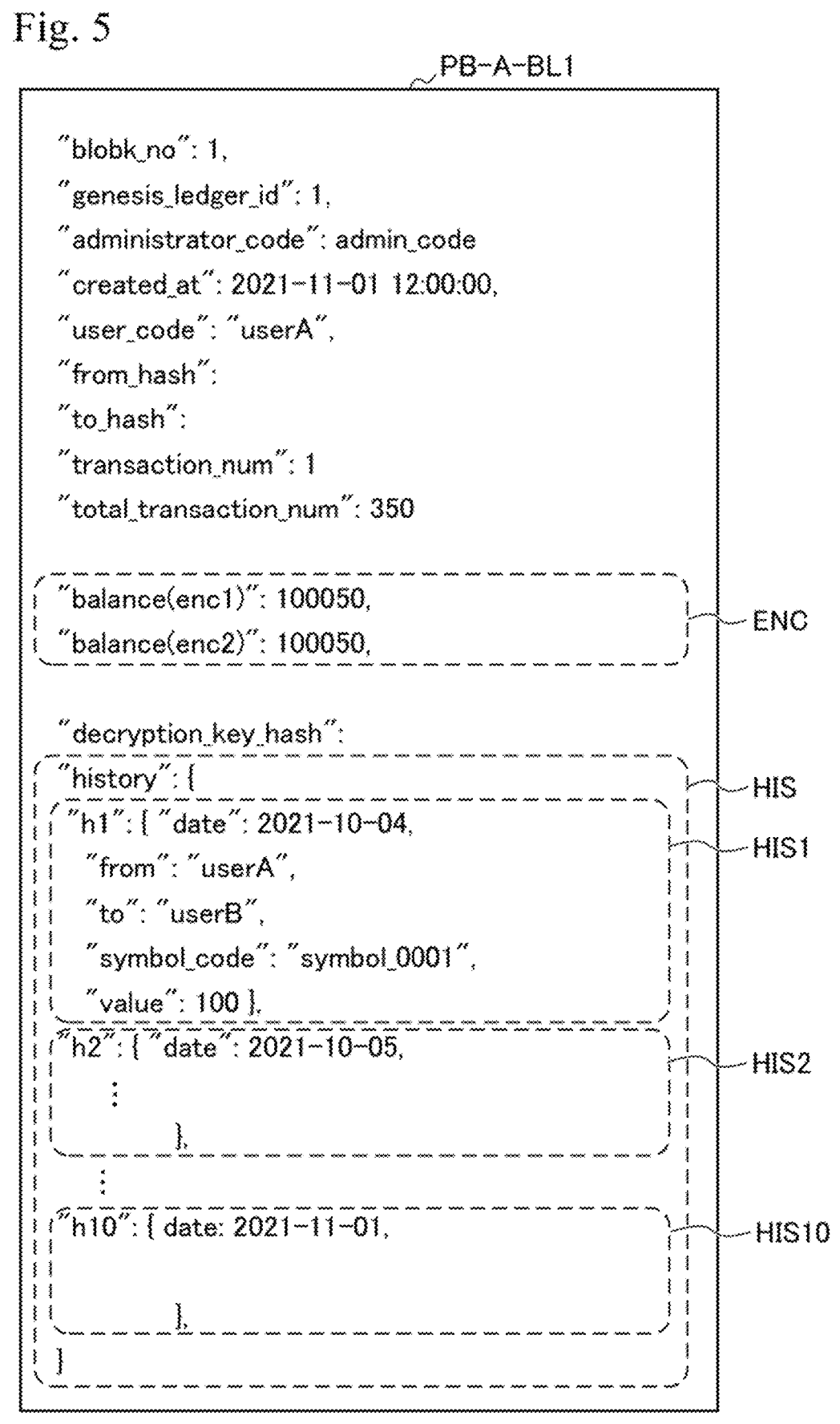

"blobk_no": 1,

"genesis_ledger_id": 1,

"administrator_code": admin_code

"created_at": 2021-11-01 12:00:00,

"user_code": "userA",

"from_hash":

"to_hash":

"transaction_num": 1

"total_transaction_num": 350

"balance(enc1)": 100050,

"balance(enc2)": 100050,

— ENC

"decryption_key_hash":

"history": [ — HIS

"h1": [ "date": 2021-10-04, — HIS1

"from": "userA",

"to": "userB",

"symbol_code": "symbol_0001",

"value": 100 ],

"h2": [ "date": 2021-10-05, — HIS2

⋮

],

⋮

"h10": [ date: 2021-11-01, — HIS10

],

]

INFORMATION PROCESSING SYSTEM

CROSS-REFERENCE TO RELATED APPLICATIONS

This application claims the benefit of priority and is a Continuation application of the prior International Patent Application No. PCT/JP2022/040532, with an international filing date of Oct. 28, 2022, which designated the United States, and is related to the Japanese Patent Application No. 2021-176068, filed Oct. 28, 2021, the entire disclosures of all applications are expressly incorporated by reference in their entirety herein.

PRIOR ART

[Patent document 1] Japanese Unexamined Patent Application Publication No. 2018-055203

BACKGROUND OF THE INVENTION

The present information relates to an information processing system.

Conventionally, there is a technology for managing transactions of changes in rights of virtual currency or the like using a blockchain or a distributed ledger (e.g., shown in Patent document 1).

However, there are scalability issues, finality issues, deletion issues after the determination of the transaction and the like in the blockchain and distributed ledger of the conventional technology including the above described Patent document 1.

Namely, as the scalability issues, the scalability of the amount of the transactions is low. Specifically, when the amount of the transactions increases, for example, it takes a long time to approve the transactions and the power consumption increases as an entire system.

In addition, as the finality issues, it is difficult to determine which of the distributed blocks is positive. Thus, it is difficult to determine the finality of the transaction.

In addition, when the transaction or the block including the transaction is approved by a large number of nodes, the transaction or the block is in a so-called fixed state. Thus, the transaction or the block cannot be deleted (canceled)

In addition, there is a desire to manage not only the rights of the virtual currency or the like but also various data (e.g., raw data related to personal information and medical treatment) in the world using the blockchain or the distributed ledger to prevent the falsification or the like of the data.

As described above, it is required to improve the convenience of the conventional management using the blockchain or the distributed ledger.

The present invention aims for improving the convenience of the management of the information using the blockchain or the distributed ledger.

SUMMARY OF THE INVENTION

In order to achieve the above described purpose, an information processing system of one aspect of the present invention includes: a unit file generation/updating unit configured to generate or update a unit file containing a history of a transaction related to a predetermined unit in a plurality of units in a predetermined service; and a management control unit configured to perform a control for storing and managing the unit file independently from the other units for each of the plurality of units in the predetermined service.

When the present invention is used, the convenience of the management using the blockchain or the distributed ledger can be increased.

BRIEF DESCRIPTION OF DRAWINGS

FIG. 3 is a drawing showing an example of Genesis JSON in the schematic diagram shown in FIG. 2.

FIG. 4 is a drawing showing an example of a finality transaction file in the schematic diagram shown in FIG. 2.

FIG. 5 is a drawing showing an example of a block data of a personal blockchain in the schematic diagram shown in FIG. 2.

DETAILED DESCRIPTION OF THE INVENTION

Hereafter, the embodiments of the present invention will be explained with reference to the drawings.

The present invention generates or updates a unit file containing a history of transactions related to a predetermined unit in a plurality of units in a predetermined service and performs a control for storing and managing the unit file independently from the other units for each of the plurality of units in the predetermined service.

First, an example of applying the present invention to the first service where the virtual currency is managed by using the blockchain as the predetermined service will be explained using FIG. 1 to FIG. 9.

Then, an example of applying the present invention to the second service where the raw data related to the personal information or the medical treatment is managed by using the blockchain as the predetermined service will be explained using FIG. 10.

Figure 1:
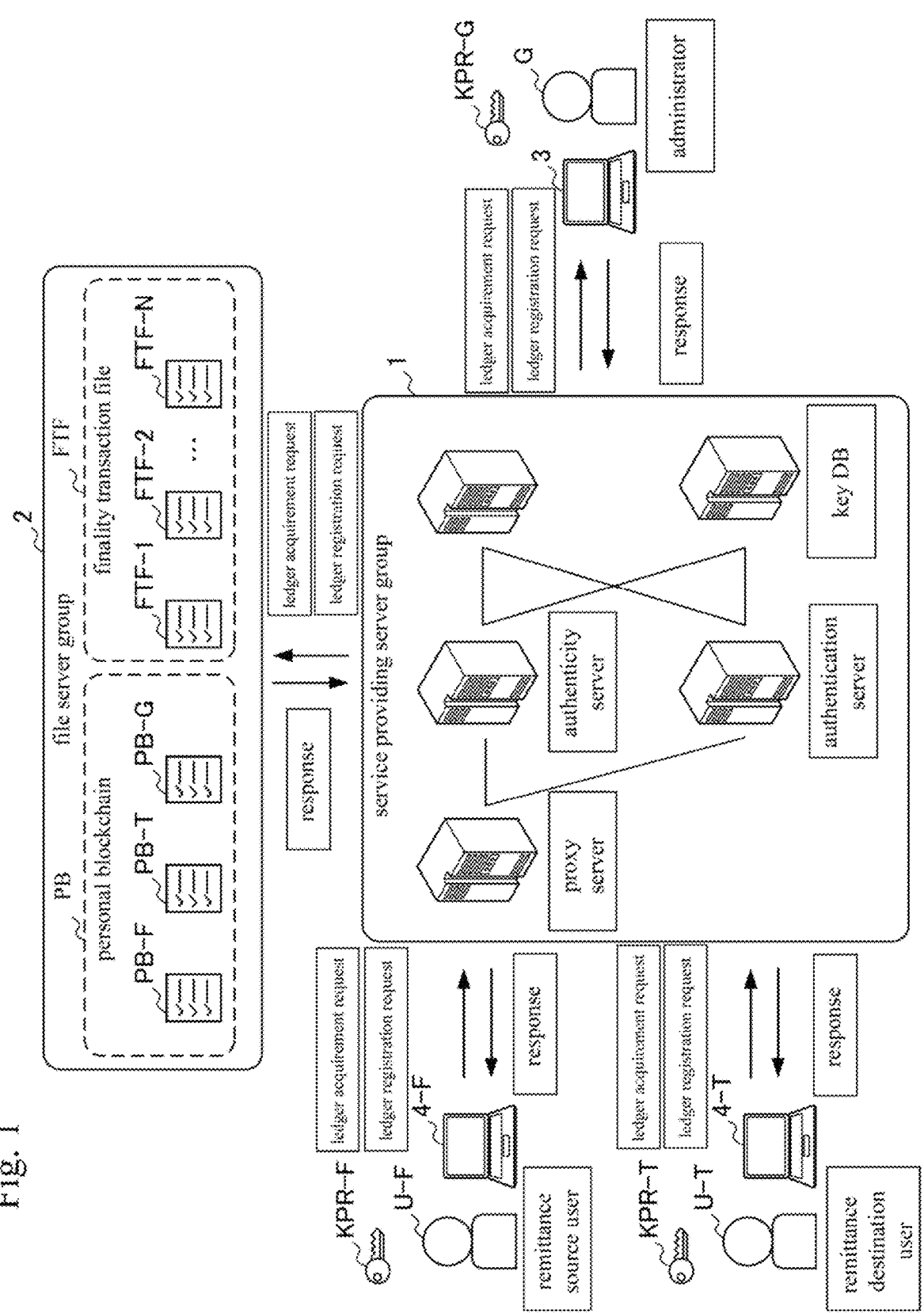
FIG. 1 is a drawing showing an outline of the first service achieved by an information processing system to which a service providing server group of one embodiment of the present invention is applied.

FIG. 1 is a drawing showing an outline of the first service achieved by an information processing system to which a service providing server group of one embodiment of the present invention is applied.

As described above, the first service is the service for managing the virtual currency using the blockchain. Namely, the first service provided by an administrator G assists the management of the virtual currency of users U of the first service via a service providing server group 1 and a file server group 2.

In the example shown in FIG. 1, a remittance source user U-F who intends to make remittance and a remittance destination user U-T who intends to receive remittance are illustrated in a plurality of users U of the first service.

The administrator G is a service provider of the first service. The administrator G receives applications for using the first service from a plurality of users U in the first service and receives applications for converting a legal currency or the like to a virtual currency used in the first service. The administrator G performs various actions to enable the users U to use the first service by making a register request to the service providing server group 1 or the like base on the content of the application, for example.

The remittance source user U-F and the remittance destination user U-T are examples of the plurality of users U of the first service.

The service providing server group 1 is the information processing system for providing the first service by generating or updating the later described various files based on the request of the transaction (e.g., request of remittance, request of opening account) in the first service.

The service providing server group 1 is managed by the administrator G of the first service.

Here, the service providing server group 1 of the present embodiment is configured to include a proxy server, an authenticity server, an authentication server and a key DB.

The proxy server is a server for processing various requests requested to the first service while acting as the first service. Namely, for example, the proxy server distributes the request requested to the first service to various servers constituting the service providing server group 1 for processing the request.

In addition, the authenticity server is a server for determining whether or not various request requested to the first service should be performed. Namely, for example, when the remittance of a predetermined amount is requested, the authenticity server determines that the remittance request should not be performed if the balance of the account of the remittance source user U-F is small compared to the predetermined amount.

In addition, the authentication server is a server for authenticating whether or not the subject who requested various request related to a predetermined account to the first service is the owner of the predetermined account.

In addition, the key DB is a database for storing keys used for the authentication of the authentication server. For example, the key DB stores a public key paired with a decryption key (private key) possessed by the administrator G.

In the example of FIG. 1, the key DB stores the public key corresponding to a decryption key KPR-G of the administrator G, the public key corresponding to a decryption key KPR-F of the remittance source user U-F, and the public key corresponding to a decryption key KPR-T of the remittance destination user U-T.

The file server group 2 is an information processing system composed of a plurality of servers (nodes) for storing and managing various files in the first service.

As will be explained in detail later, a personal blockchain PB and a finality transaction file FTF are stored in the file server group 2.

Here, "personal blockchain" is a ledger file using the blockchain where the ledger file is associated with the account of the virtual currency and the ledger file contains the latest information of the balance and the transaction of the account. The personal blockchain PB is generated or updated for each of the accounts. Namely, the personal blockchain PB is generated or updated as a blockchain independent from the blockchains of the other accounts.

Namely, the personal blockchain PB using the blockchain is generated for each of the accounts of the virtual currency in the first service.

In the example of FIG. 1, a personal blockchain PB-G of the administrator G, a personal blockchain PB-F of the remittance source user U-F and a personal blockchain PB-T of the remittance destination user U-T are stored in the file server group 2.

In addition, "finality transaction file" is a file storing the content of the transaction by performing an encryption processing. Note that the content of the transaction at least includes the information related to the remittance amount, the latest balance of the remittance source and the latest balance of the remittance destination. For example, when the request is made, the service providing server group 1 determines that the remittance request can be performed if a predetermined condition is satisfied, as described above. Specifically, when the remittance request of the predetermined amount is made, it is determined that the remittance request can be performed if the balance of the account of the remittance source user U-F is larger than the predetermined amount.

The later described encryption processing is performed on the content of the transaction in accordance with the remittance request and the finality transaction file FTF is generated. Then, the finality transaction file FTF is stored in the file server group 2. Consequently, the processing (transaction) of the request is completed.

In other words, the processing of the request is considered to be completed when the finality transaction file FTF exists in the file server group 2.

In the example of FIG. 1, the transactions of N times have been completed and N finality transaction files FTF-1 to FTF-N are stored in the file server group 2.

Here, all of the transactions between the users are stored in one blockchain in the conventional management using the blockchain. Because of this, the above described conventional problems occur.

On the other hand, the first service has the following characteristics.

Namely, the first service is the ledger system that records and stores all of the conventional data while maintaining the characteristics of transparency and the tamper resistance. In addition, the first service is the system that guarantees information-theoretically security and the system that can withstand decoding by quantum computers. Thus, the ledger system that can manage the data in the distributed state for each file with high security is achieved.

In addition, as will be explained in detail later, the ledger is distributed by unit (account in the first service). Consequently, the power consumption can be reduced and the scalability of the transaction can be increased compared to the transaction processing using the ordinary database or the conventional blockchain. Thus, the above described disadvantage of the blockchain can be eliminated.

With the above described features, the first service can be a platform which can realize a finance service having resistance to attacks using a quantum computer or the like without receiving a phishing fraud or a mediator attack and realize a digital currency issuing service with high transaction processing speed even on a low-specification server or the like.

Furthermore, the first service has the following features.

In addition, the file server group 2 is the information processing system composed of a plurality of servers (nodes) for storing and managing various files in the first service, as described above. The servers in the file server group 2 can store the files in each of the nodes in a distributed state by cooperating with each other by the communication of P2P. At this time, the file server group 2 stores only the personal blockchain PB and the validation results of the transaction such as the finality transaction file FTF, as described above.

HTTP communication based on the common key encryption system is used for the communication among each of the servers (nodes) of the service providing server group 1 and the file server group 2, an administrator terminal 3 of the administrator G, a user terminal 4-F of the remittance source user U-F and a user terminal 4-T of the remittance destination user U-T.

In addition, the user can freely select an approval node to ask the processing by paying a fee.

Namely, for example, although a software maintained by the administrator G who is a provider of the first service is installed in the authenticity server or the like included in the service providing server group 1, the hardware resource may be actually provided and managed by another person. In the above described case, a fee is paid to the person providing and managing the hardware resource.

In addition, since the files to which the later described encryption processing is applied are stored, it is possible to verify whether or not the transaction data is fraudulent. If the transaction data is fraudulent, it is possible for the remittance source user U-F or the remittance destination user U-T to ask the service providing server group 1 to correct the transaction.

Hereafter, how the personal blockchain PB and the finality transaction file FTF are generated and updated when the transaction actually occurs will be explained using FIG. 2 and the following figures. In this regard, the terms used in the first service will be explained first.

At the beginning of the first service, there is no balance in any account at all. In addition, when a new user opens the account, although the initial balance of the account can be generated from the remittance request, the account of the remittance source is required for the remittance request.

Therefore, the above described initial account with a large amount of balance is called "Genesis account." The account possessed by the administrator G in FIG. 1 for performing the above described processing is particularly called the Genesis account.

The JSON file on which the basic information of the ledger is described is particularly called "Genesis JSON."

Namely, the following explanation will be made in condition that various information contained in the personal blockchain PB is managed as items and values in JSON format in the first service.

Figure 2:
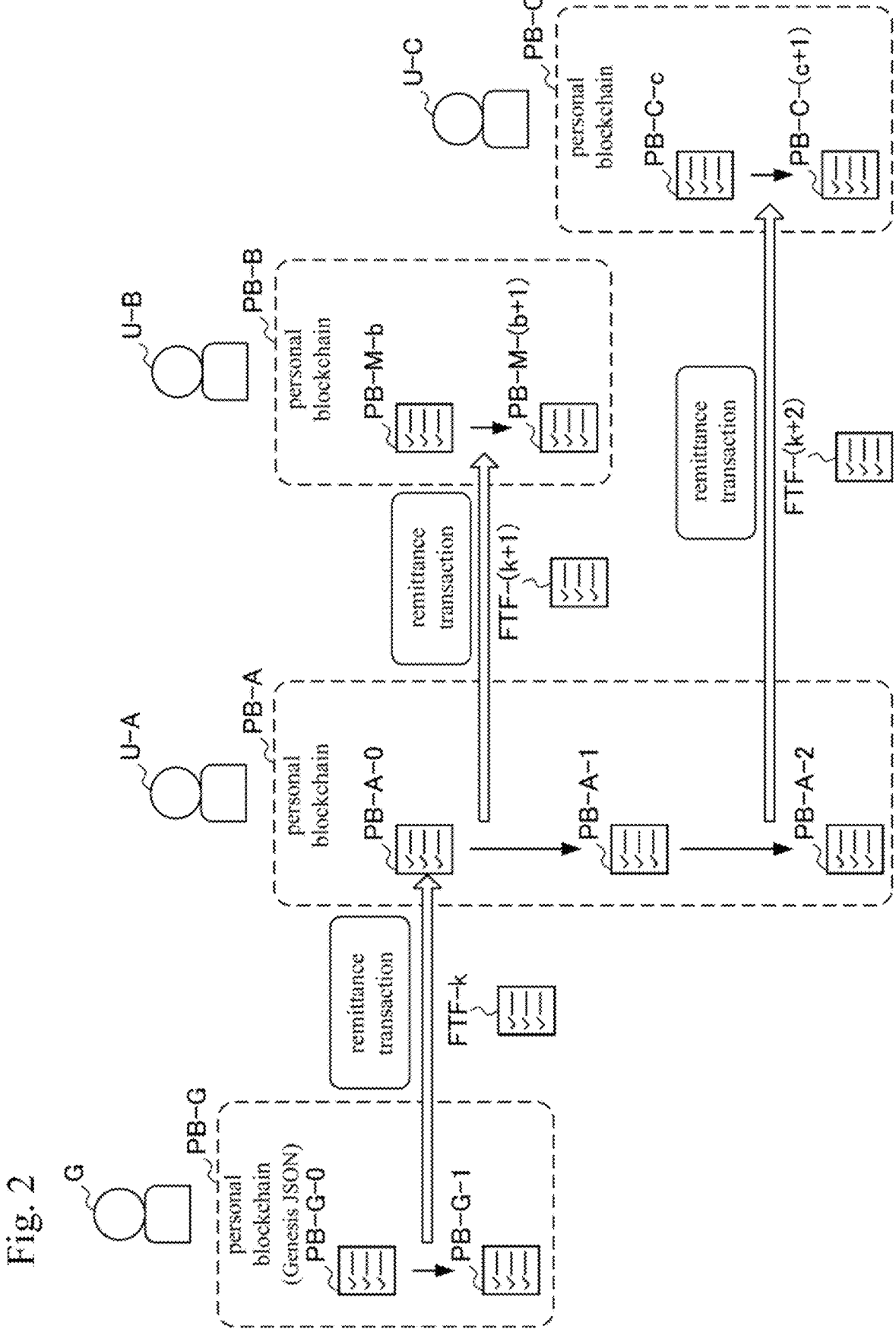
FIG. 2 is a schematic diagram showing a flow of a generation or an update of a transaction and a blockchain in the first service shown in FIG. 1.

FIG. 2 is a schematic diagram showing a flow of the generation or the update of the transaction and the blockchain in the first service shown in FIG. 1.

An administrator G, a user U-A, a user U-B and a user U-C are illustrated in FIG. 2.

First, Genesis JSON, which is an initial account information of the administrator G, will be explained.

FIG. 2 illustrates a personal blockchain PB-G-0 of the administrator G. The personal blockchain PB-G-0 is the initial state of the personal blockchain PB-G of the administrator G. Namely, the personal blockchain PB-G-0 is the above described Genesis JSON. Genesis JSON contains extremely large amount of balance.

The balance contained in Genesis JSON is used when a remittance transaction is made to the user U-A who newly creates an account.

Next, it is supposed that the user U-A intends to newly create an account.

In this case, the user U-A makes payment to the administrator G using a legal currency corresponding to the initial payment amount in the real world. As a result, the administrator G makes the remittance request for the payment amount.

Consequently, the remittance transaction is made from Genesis account of the administrator G to the user U-A. Thus, the account of the user U-A is opened.

Specifically, a remittance is made from the administrator G to the user U-A, for example. As a result, the finality transaction file FTF-k (k is an integer value equal to or larger than 1) containing the content of the remittance transaction is generated.

Then, a personal blockchain PB-G-1 whose balance is reduced by the amount of the remittance is generated from the personal blockchain PB-G-0 of the administrator G.

In addition, an initial personal blockchain PB-A-0 of the user U-A is generated.

As described above, the account of the user U-A is opened.

Next, the case where the user U-A makes the remittance (transfers the money) to the user U-B will be explained.

When the user U-A makes the remittance to the user U-B, the finality transaction file FTF-(k+1) containing the content of the remittance transaction is generated.

Then, a personal blockchain PB-A-1 whose balance is reduced by the amount of the remittance is generated from the personal blockchain PB-A-0 of the user U-A.

In addition, the personal blockchain PB-B-(b+1) whose balance is increased by the amount of the remittance is generated from the personal blockchain PB-B-b (b is an integer value equal to or larger than 1) of the user U-B.

As described above, the remittance is made from the user U-A to the user U-B.

FIG. 2 also illustrates the example where the user U-A makes the remittance to the user U-C. The explanation is omitted since the above described example is basically same as the case where the user U-A makes the remittance to the user U-B.

It should be noted here that the personal blockchain PB-G of the administrator G, the personal blockchain PB-A of the user U-A, the personal blockchain PB-B of the user U-B and the personal blockchain PB-C of the user U-C are separately shown by broken lines in FIG. 2. This means that the personal blockchain PB is generated and updated for each of the accounts (i.e., as the blockchain independent from the other accounts) as described above.

As described above, the information of the balance and the like of the account of each of the users U is managed by using the personal blockchain PB for each of the users U (accounts).

In other words, only the information related to the transaction of each of the users U is recorded in the personal blockchain PB of each of the users U.

FIG. 3 is a drawing showing an example of Genesis JSON in the schematic diagram shown in FIG. 2.

As shown in FIG. 3, the personal blockchain PB-G-1 (Genesis JSON) includes a balance BAL, an encrypted balance ENC and a history HIS of the transaction.

The balance BAL is an extremely large value. Since the balance BAL which is the extremely large value is transferred to the account of each of the users U, each of the users can make the remittance by a legal currency or the like.

In the history HIS, the history HIS1 is the history of the remittance to the user U-A shown in FIG. 2. Referring to the history HIS1, it can be seen that the user U-A opened the account by making the remittance of 100000 yen.

As described above, the history HIS of the opening of the account and the like is sequentially recorded in Genesis JSON.

Here, the encrypted balance ENC is stored in Genesis JSON. However, in FIG. 3, the item of "balance(enc)" which is the encrypted balance ENC is illustrated as numbers of unencrypted plaintext for facilitating the understanding.

The encrypted balance ENC is stored as a character string of the result of encrypting the numbers of the latest balance using an encryption key by the administrator G. The decryption key corresponding to the encryption key is stored in the file server group 2.

Note that the identifier for identifying the decryption key corresponding to the encryption key is stored in "crypto-_key" of Genesis JSON.

Consequently, another person can verify that the transaction is certainly approved by the administrator G by decrypting the encrypted balance ENC using the decryption key and comparing it with the balance BAL.

FIG. 5 is a drawing showing an example of the block data of the personal blockchain in the schematic diagram shown in FIG. 2.

As shown in FIG. 5, the block PB-A-BL1 of the personal blockchain PB-A includes the balance BAL, the encrypted balance ENC and the history HIS of the transaction.
Block Data Holding Structure on P2P Network Here, the history HIS of the transaction includes ten histories HIS1 to HIS10.

This means that one block is generated every ten transactions of the account of the user A.

Namely, in the first service, although the history is recorded in the personal blockchain when the transaction occurs in the account of the user A, the block containing the history is not generated. Then, the block is generated when ten histories are accumulated as a predetermined condition, for example. Consequently, the frequency of generating the block is reduced and the cost of generating the block can be limited since the maximum size of the block is approximately the size of ten histories. Consequently, the processing of the transaction can be executed at a high speed.

"from_hash" is the identifier (hash value) for identifying the previous personal blockchain. In addition, "to_hash" is the identifier (hash value) for identifying the previous transaction JSON.

"transaction_num" is the number of times of executing the transaction executed by user_code.

"total_transaction_num" is the number of times of executing the transaction executed by the administrator.

The decryption key of the user is uploaded to a file server.

The private key on the system side creates an encrypted encryption key and decryption key and stores them in a non-disclosed area.

In addition, the maximum storage period of the block can be set to one year. When the storage period has passed, the lock of the block locked by PIN is released in batch and the block is deleted.

Here, the balance encrypted by performing full encryption is recorded as the encrypted balance ENC.

"balance(enc1)" is the information (character string) of the balance encrypted by using the encryption key held by the users U who is the owner of the account.

"balance(enc2)" is the information (character string) of the balance encrypting "balance(enc1)" by using the encryption key held by the administrator G. As described above, the multi-encrypted character string (ciphertext) is recorded.

Consequently, it is guaranteed that "balance(enc2)" is the block data approved by the approval node.

Next, a processing flow for executing the remittance request will be explained using FIG. 6.

Figure 6:
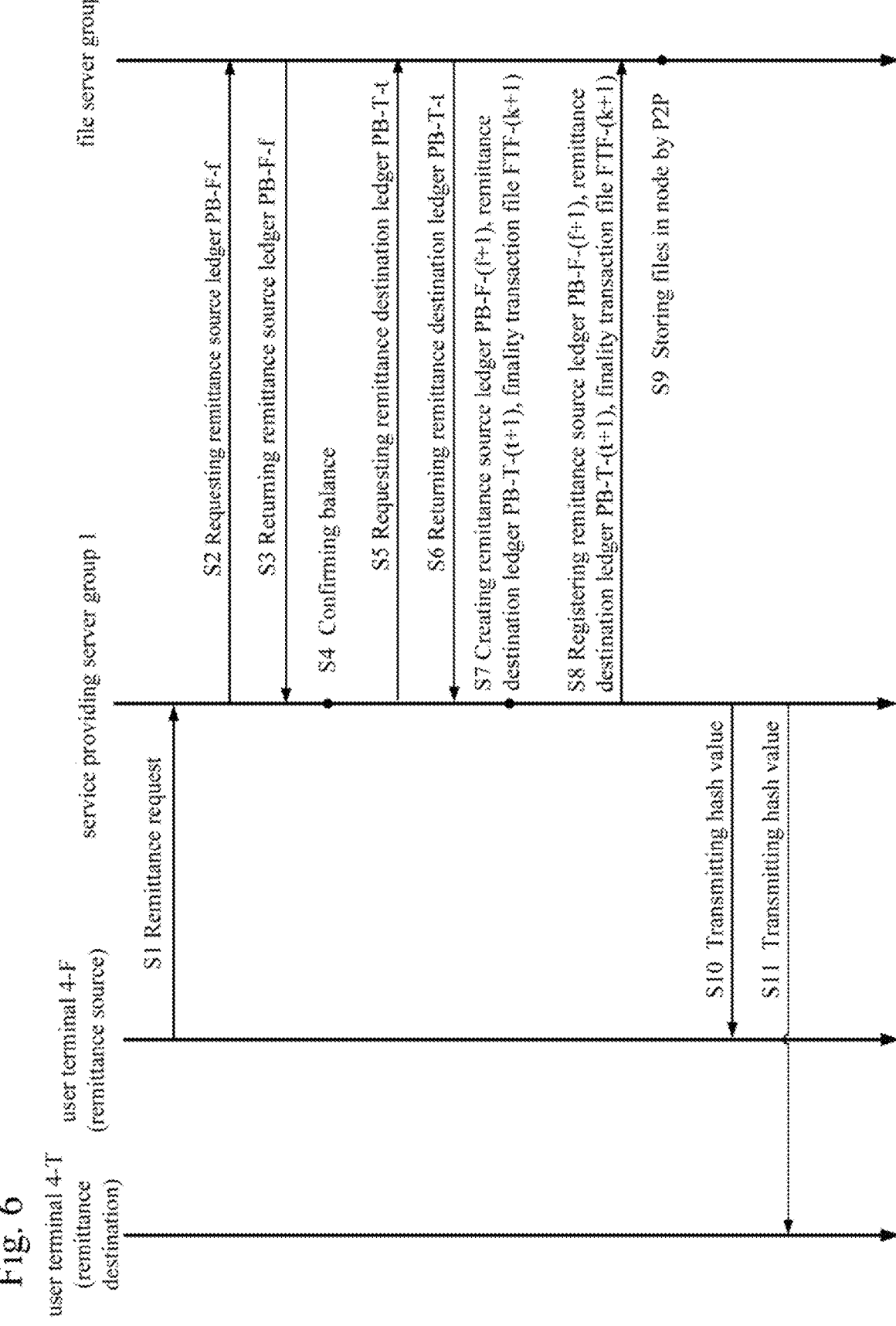
FIG. 6 is a drawing showing a processing flow of a remittance request between a remittance source user and a remittance destination user shown in FIG. 1.

FIG. 6 is a drawing showing the processing flow of the remittance request between the remittance source user and the remittance destination user shown in FIG. 1.

In Step S1, a user terminal 4-F transmits the remittance request to the service providing server group 1.

In Step S2, the service providing server group 1 requests a remittance source ledger PB-F-f (f is an integer value equal to or larger than 1 corresponding to the number of the renewal of the personal blockchain PB-F) to the file server group 2.

In Step S3, the file server group 2 returns the remittance source ledger PB-F-f.

In Step S4, the service providing server group 1 confirms the balance and the like of the remittance source ledger PB-F-f. When it is determined that the remittance request can be executed, the process proceeds to Step S5.

In Step S5, the service providing server group 1 requests a remittance destination ledger PB-T-t (t is an integer value equal to or larger than 1 corresponding to the number of the renewal of the personal blockchain PB-T) to the file server group 2.

In Step S6, the file server group 2 returns the remittance destination ledger PB-T-t.

In Step S7, the service providing server group 1 creates (generates or updates) the remittance source ledger PB-F-(f+1) and the remittance destination ledger PB-T-(t+1).

In Step S8, the service providing server group 1 registers the remittance source ledger PB-F-(f+1) and the remittance destination ledger PB-T-(t+1) on the file server group 2.

In Step S9, the file server group 2 stores the files in each node by P2P.

In Step S10, the service providing server group 1 transmits the hash value of the latest remittance source ledger PB-F-(f+1) to the user terminal 4-F.

In Step S11, the service providing server group 1 transmits the hash value of the latest remittance destination ledger PB-T-(t+1) to the user terminal 4-T.

Consequently, the user terminal 4-F and the user terminal 4-T can acquire the information of their own personal blockchain from the file server group 2 and confirm the information.

As described above, the remittance request is executed.

The processing of various request (transaction) in the first service is described above using FIG. 1 to FIG. 6. Hereafter, the configuration and the like of the information processing system for providing the first service will be explained using FIG. 7 to FIG. 9.

Figure 7:
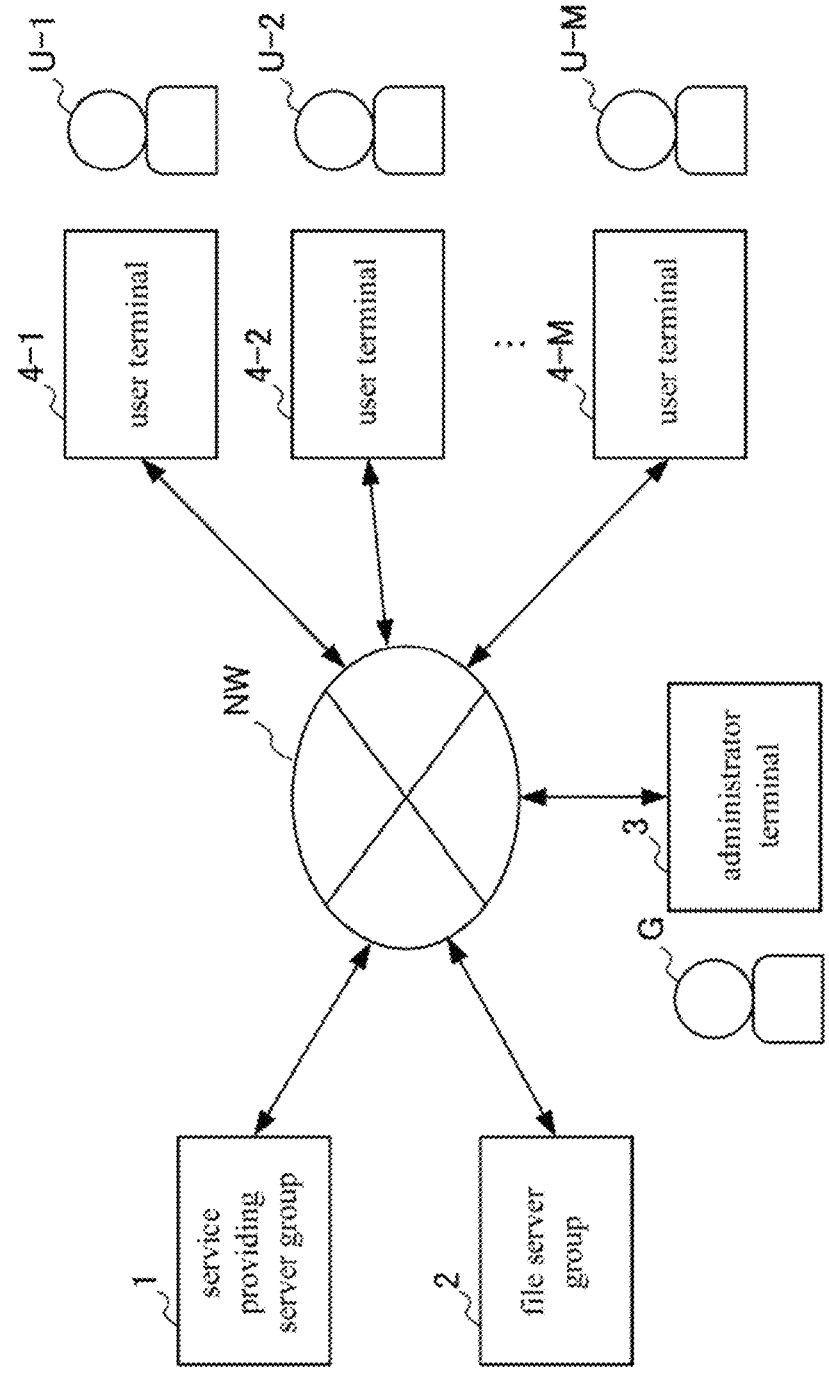
FIG. 7 is a drawing showing a configuration example of the information processing system to which the service providing server group of one embodiment of the present invention shown in FIG. 1 to FIG. 6 is applied.

FIG. 7 is a drawing showing the configuration example of the information processing system to which the service providing server group of one embodiment of the present invention shown in FIG. 1 to FIG. 6 is applied.

The information processing system shown in FIG. 7 is configured to include a service providing server group 1, a file server group 2, an administrator terminal 3 and user terminals 4-1 to 4-M (M is an integer value equal to or larger than 1) which are connected to each other via a predetermined network such as Internet NW.

As described above, the service providing server group 1 is the information processing system for providing the first service by generating or updating the later described various files based on the request of the transaction (e.g., request for remittance and request for opening account) in the first service.

Although the service providing server group 1 is configured to include plurality of servers (e.g., proxy server, authenticity server, authentication server and key DB) in the explanation of FIG. 1, the present invention is not limited to the above described configuration. Namely, the service providing server group 1 can be formed by one information processing device, for example. In addition, a part or an entire of the plurality of servers constituting the service providing server group 1 can be implemented as virtual servers emulated on one information processing device, for example.

In addition, as described above, the file server group 2 is the information processing system formed by a plurality of servers (nodes) for storing and managing various files in the first service.

Note that the file server group 2 can be also formed by one information processing device similar to the service providing server group 1.

Hereafter, the explanation will be made in condition that each of the service providing server group 1 and the file server group 2 is achieved by one information processing device in the explanation of FIG. 7 to FIG. 9.

The administrator terminal 3 is the information processing device used by the administrator G. The administrator G makes requests such as the opening of the account of the users U via the administrator terminal 3.

The user terminals 4-1 to 4-M are the information processing device used by the users U-1 to U-M respectively in the first service. Hereafter, the user terminals 4-1 to 4-M are collectively referred to as "user terminal 4" when it is not necessary to distinguish the user terminals 4-1 to 4-M from each other.

Figure 8:
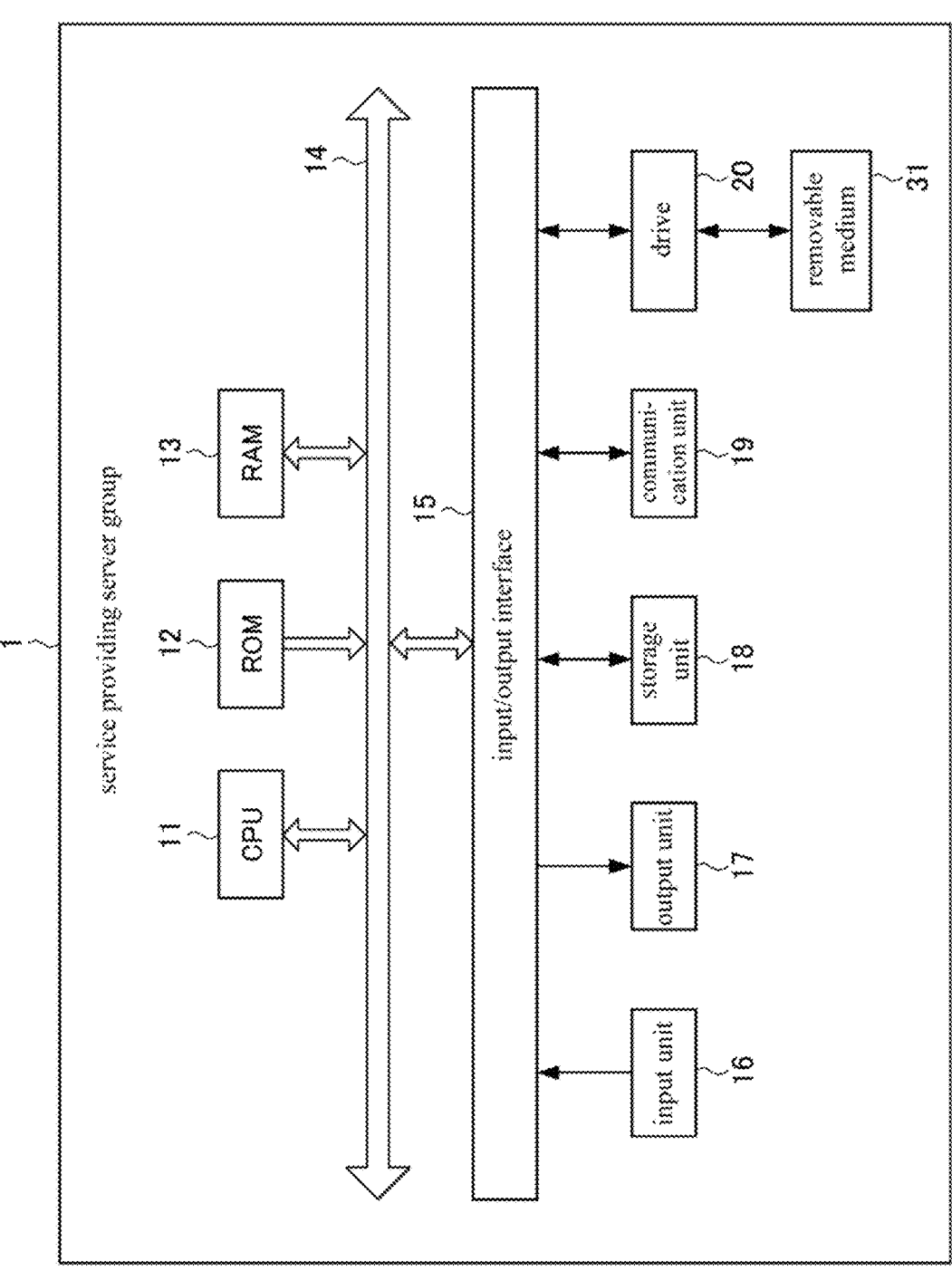
FIG. 8 is a block diagram showing a hardware configuration of a server in the information processing system shown in FIG. 7.

FIG. 8 is a block diagram showing the hardware configuration of the server in the information processing system shown in FIG. 7.

The server 1 includes a CPU (Central Processing Unit) 11, a ROM (Read Only Memory) 12 a RAM (Random Access Memory) 13, a bus 14, an input/output interface 15, an input unit 16, an output unit 17, a storage unit 18, a communication unit 19 and a drive 20.

The CPU 11 executes various processing in accordance with the programs recorded in the ROM 12 and the programs loaded from the storage unit 18 to the RAM 13.

The data and the like necessary for the CPU 11 to execute various processing are appropriately stored in the RAM 13.

The CPU 11, the ROM 12 and the RAM 13 are connected to each other via the bus 14. The input/output interface 15 is also connected to the bus 14. The input unit 16, the output unit 17, the storage unit 18, the communication unit 19 and the drive 20 are connected to the input/output interface 15.

The input unit 16 is composed of various hardware and the like to input various information from the input unit 16.

The output unit 17 is composed of various liquid crystal displays and the like to output various information from the output unit 17.

The storage unit 18 is composed of DRAM (Dynamic Random Access Memory) and the like to store various data in the storage unit 18.

The communication unit 19 controls the communication with the other devices via the network including the Internet.

The drive 20 is provided if necessary. A removable medium 31 composed of a magnetic disk, an optical disk, a magneto optical disk, a semiconductor memory or the like is appropriately installed on the drive 20. The programs read from the removable medium 31 by the drive 20 are installed in the storage unit 18 if necessary. In addition, the removable medium 31 can also store various data stored in the storage unit 18 similar to the storage unit 18.

Although the illustration is omitted, the file server group 2, the administrator terminal 3 and the user terminal 4 also have the hardware configuration shown in FIG. 8.

Figure 9:
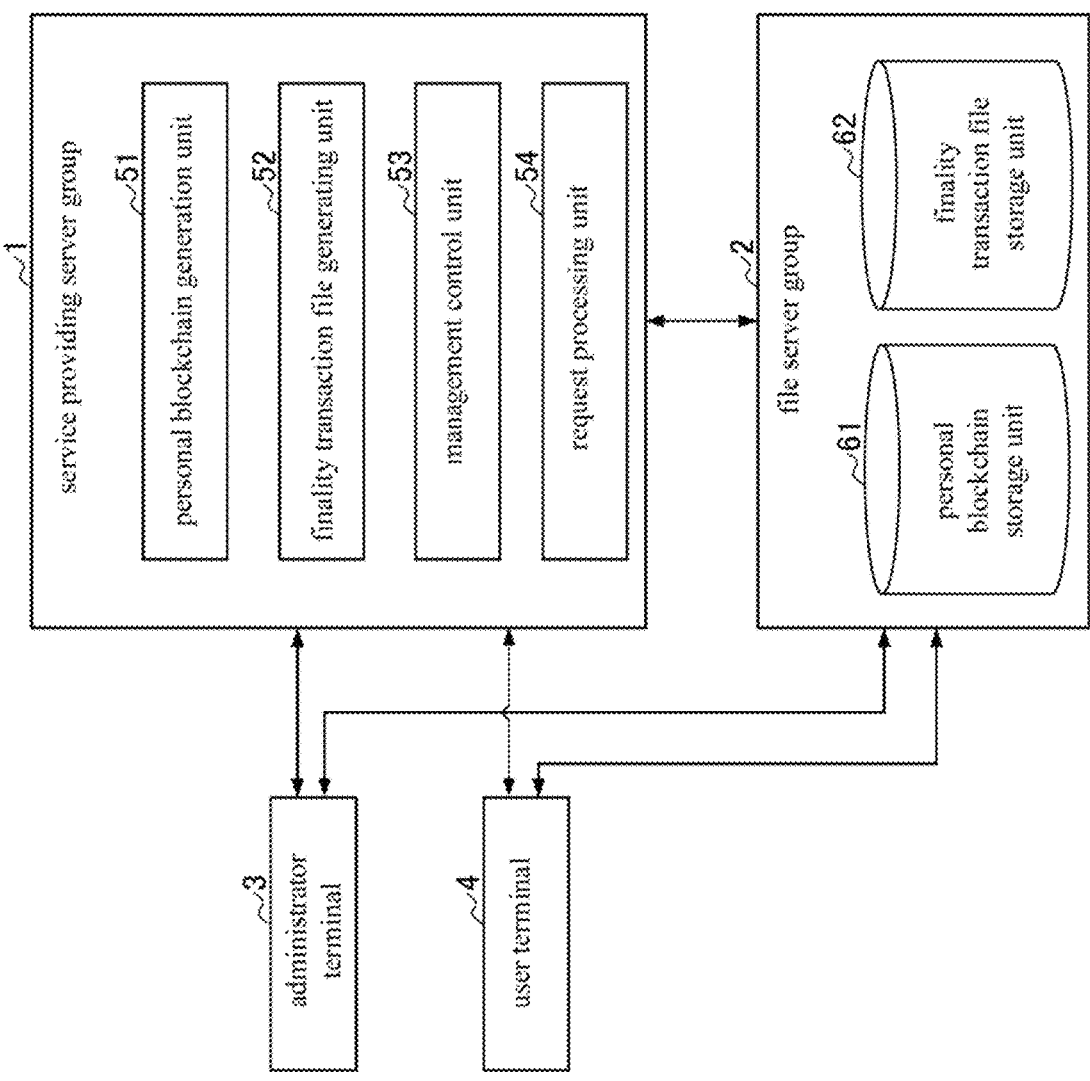
FIG. 9 is a functional block diagram showing an outline of a functional configuration of the service providing server group shown in FIG. 8.

FIG. 9 is a functional block diagram showing the outline of the functional configuration of the service providing server group shown in FIG. 8.

As shown in FIG. 9, a personal blockchain generation unit 51, a finality transaction file generating unit 52, a management control unit 53 and a request processing unit 54 function in the service providing server group 1.

A personal blockchain storage unit 61 and a finality transaction file storage unit 62 are provided on the file server group 2.

The personal blockchain generation unit 51 generates or updates the personal blockchain containing the history of the transaction related to a predetermined account in a plurality of accounts in the service.

The finality transaction file generating unit 52 generates the file containing the content of the transaction when the transaction related to the predetermined account is finished.

The management control unit 53 executes the control to store the personal blockchain PB generated by the personal blockchain generation unit 51 in the personal blockchain storage unit 61. In addition, the management control unit 53 executes the control to store the finality transaction file FTF generated by the finality transaction file generating unit 52 in the finality transaction file storage unit 62.

Specifically, the management control unit 53 executes the control to manage the personal blockchain of the predetermined account separately from the other accounts for each of a plurality of accounts in the service. Namely, the management control unit 53 executes the control to store the personal blockchain PB of each of the plurality of accounts in the personal blockchain storage unit 61 for each of the plurality of accounts.

The request processing unit 54 receives the request from the administrator terminal 3 and the user terminal 4. Then, the request processing unit 54 executes the processing such as the authentication of the administrator G or the users U and the determination of the authenticity of the requested content for the received request. When it is determined by the determination result that the requested processing can be performed, the personal blockchain generation unit 51 generates the personal blockchain PB. In addition, the finality transaction file generating unit 52 generates the finality transaction file FTF.

The personal blockchain storage unit 61 stores the personal blockchain PB of each of the plurality of accounts.

The finality transaction file storage unit 62 stores the finality transaction file FTF of the finished transaction.

An example of the functional configuration of the service providing server group 1 is described above referring to FIG. 9.

Although one embodiment of the present invention is explained above, the present invention is not limited to the above described embodiment. Modifications and improvements within the range capable of achieving the purpose of the present invention are included in the present invention.

Specifically, the first service preferably has the following functions and features, for example.

Namely, the management of the account is performed for each unit of the personal blockchain PB shared by the P2P for each of the users U.

Consequently, each of the users U can refer to the personal blockchain PB of each of the users U from the file server group 2.

In addition, the client can transmit the request to the authentication server by multiple encryption communication.

In addition, the predetermined conditions for the determination (determination of the request processing unit in FIG. 9) of the authentication server and the authenticity server can include anti-money laundering conditions.

In addition, the first service provides the following advantages because the distributed cryptographic ledger management is performed for each of the accounts in the first service. Namely, the speed of the processing can be accelerated compared to the databases such as SQL. In addition, the first service can be operated even when the specifications of the service providing server group 1 is lower than usual. In other words, the service providing server group 1 is resistant to the high load such as a large number of transactions. In addition, since the determination is made and the finality is managed on each of the accounts, the performance of asynchronous and parallel processing becomes more advanced. In addition, the first service enables the communication having quantum-resistant by using full encryption. The finality, the decentralization and the transparency can be simultaneously achieved by the first service.

It is preferable to add the following additional functions to the first service.

For example, it is preferable that a backup function using P2P is provided.

Here, the backup is preferably performed by using a key transmitted by a multiple encryption method.

It is also preferable that a secret communication function by a common key encryption method is provided. Namely, a secret communication by a multiple encryption method is performed.

It is also preferable that a reward function is provided by providing a file capacity of P2P.

Namely, the reward function is the function where the user U can receive a reward by sharing a part of the storage area of the file server group 2 using the user terminal 4.

In addition, the following specifications can be adopted for the authentication method.

Namely, when KYC is present, the two-stage authentication of the multiple encryption communication using an ID, a password and a PIN or the authentication using a private key held by the user can be adopted.

In addition, when KYC is not present, the authentication of a common key encryption using a private key held by the user can be adopted.

Here, the secret communication using the common key encryption method will be additionally explained.

The secret communication using the common key encryption method is the method used when the communication between the user and the service providing server group 1 is required. Namely, the service providing server group 1 and the users U have the same common key, and a passphrase is issued by the number of events. Then, the passphrase can be used as a value for the secret communication.

Furthermore, the backup using P2P will be additionally explained.

As described above, the personal blockchain is uploaded to the P2P file server.

Consequently, the management is basically performed in a backed-up state.

Here, the method for identifying the files uploaded to the P2P file server is as follows. Namely, as for the file consensus formation, the encrypted files of both the user and the approver can be uploaded as a multiple cipher. The file that cannot be decrypted can be regarded as an illegal file.

Furthermore, the secret communication by the multiple encryption system will be additionally explained.

Namely, two encryption and two decryption requests (e.g., encryption by user U, encryption by service providing server group 1, decryption by user U and decryption by service providing server group 1) are performed between the user U and the service providing server group 1. Thus, the secret communication can be performed to the other party without transporting the keys.

Next, the reward function by providing the file capacity of the P2P server will be additionally explained.

Namely, the reward function is the system for giving an incentive to the server (user U) which has contracted to provide the capacity for the backup of the files. The incentive can be provided to the server holding the data at an amount corresponding to the fee generated by the remittance.

The trigger (i.e., predetermined condition) which generates the finality transaction file will be additionally explained. Namely, the predetermined condition may include a check for money laundering, for example. It is also possible to employ an arbitrary program decision algorithm, for example. It is also possible to include the completion of an audit by human eyes, for example.

The processing for the case where the registration of the personal blockchain fails will be additionally explained.

First, the content of the finality transaction file is described in the transaction history of the block. Namely, the content can be viewed by the user.

It is assumed that the description has failed at this time. In this case, it is possible to perform the processing of correcting and describing description omissions in the history by processing by a batch started as a job of the service providing server group 1.

It is also possible to freeze the authentication data so that the authentication cannot be performed as a countermeasure to the freezing processing of the unauthorized users, for example. Then, the number of points can be investigated and corrected to the correct value.

When a similar personal blockchain (JSON data) is uploaded by a malicious user, it can be determined as follows, for example.

Namely, the block information contains the value of the amount possessed by the target user in an encrypted state encrypted with the keys of the administrator and the user. Consequently, the block information cannot be decrypted without both keys. Because of the above described property, the correct block information can be recognized and processed.

Here, the fact that the history can be tracked even if the history is encrypted will be additionally explained.

Namely, the encryption is carried out according to a certain rule for the amount of money possessed.

The other information is stored as a plaintext similar to the traditional blockchain. Therefore, the pager function can be easily executed as the client-side processing.

Furthermore, the case where the history and the amount of the balance of the account are encrypted will be additionally explained.

In the case of conventional blockchain, anyone can view all the information. In the first service, only the balance can be encrypted.

Furthermore, the introduction of a smart contract will be additionally explained.

Smart contracts can be introduced in the first service depending on the specification.

Specifically, it is possible to start a closed docker and execute the code in the closed docker instead of typing an exec command by typescript, for example.

Next, the cancellation of the transfer will be additionally explained.

In General, the transfer itself cannot be cancelled once the transfer is accepted. However, the procedure for the reverse transaction can be performed when it is requested depending on the specification.

Specifically, the procedure for the reverse transaction requires a predetermined procedure.

Here, it takes a long time for the reverse transaction since the recipient's acceptance and a predetermined procedure are required.

At this time, the funds cannot be returned without the recipient's acceptance. In addition, the original transfer fee cannot be returned. In addition, when the funds are returned, a refunding fee is charged separately.

The example of applying the present invention to the first service for managing the virtual currency using the blockchain has been explained above.

Hereafter, the example of applying the present invention to the second service for managing the raw data related to personal information and medical treatment using the blockchain as a predetermined service will be explained with reference to FIG. 10.

Figure 10:
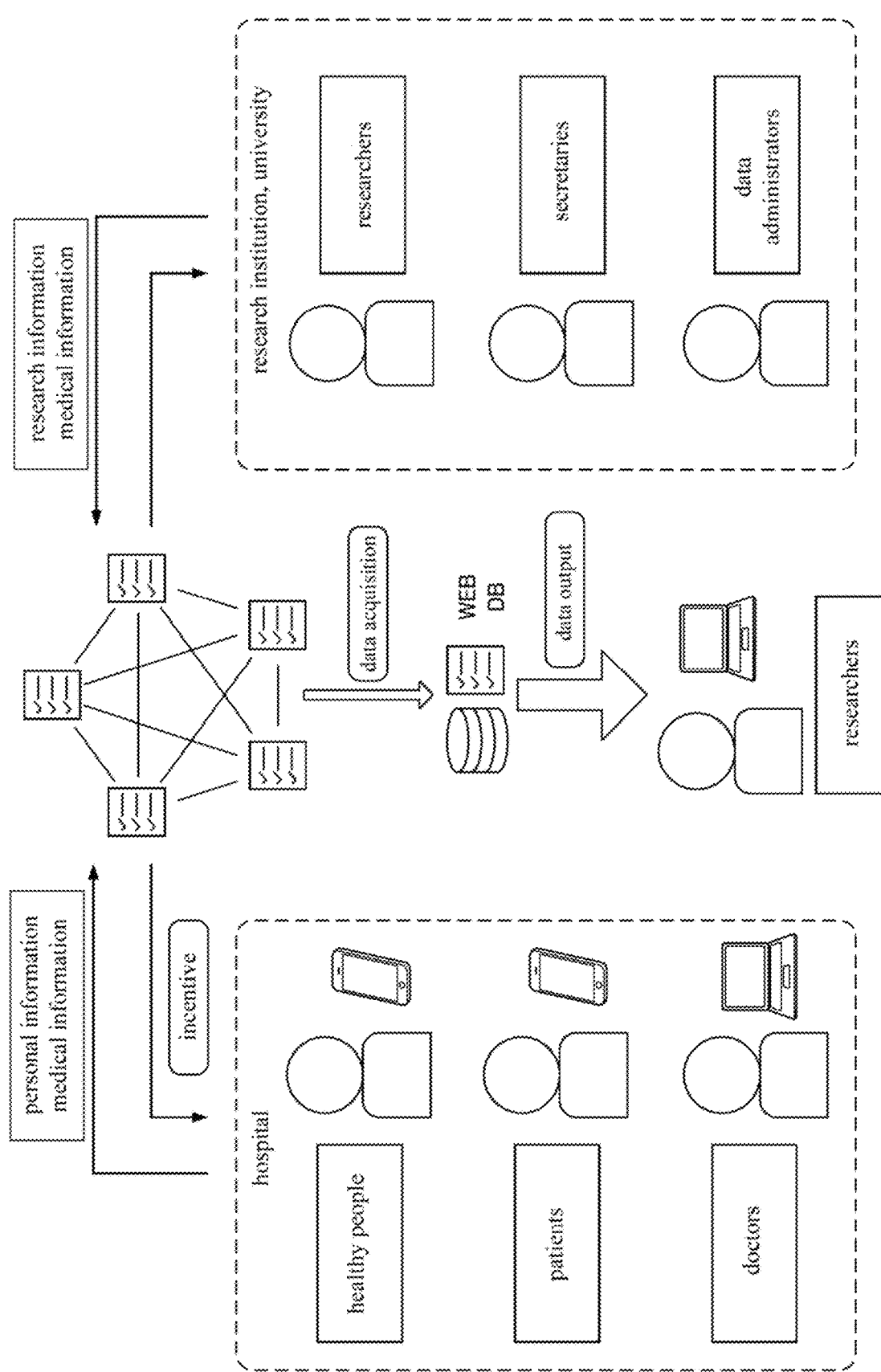
FIG. 10 is a drawing showing an outline of the second service for managing raw data related to personal information and medical treatment.

FIG. 10 is a drawing showing an outline of the second service for managing raw data related to personal information and medical treatment.

As shown in FIG. 10, the raw data related to personal information and medical treatment is provided by researchers, secretaries and data administrators affiliated with research institutions and universities. In addition, the raw data related to personal information and medical treatment is (consequently) provided by healthy people, patients, doctors and the like who visit a hospital. In order to properly use the above described raw data in research, it is necessary to control the raw data without falsification. Therefore, the second service can be achieved by managing the above described data for each predetermined unit of the second service as described above.

In addition, the hospital can be encouraged to introduce the second service by providing an incentive in return for providing the information.

As a result, substantial data that is free from falsification can be provided to the researchers.

Specifically, the same raw data can be shared with the organization and the institution to which the researchers belong. Consequently, a fair data sharing method is provided.

In addition, a variety of transparent incentive functions can be realized. Specifically, electronic money exchange and goods by lottery can be provided as the incentive.

In addition, uniqueness of the data registrant can be guaranteed. Consequently, the data registrant who recorded the data can be recorded in a form that the data cannot be altered.

The present invention is also applicable to the following service systems.

NFT publishing system and market place having high tamper resistance capable of managing content by user Service free from phishing fraud and man-in-the-middle attack Quantum-computer resilient financial services and currency issuing system Digital currency issuance service of fastest transaction processing Platform which is secure and operable in low-spec server Traceability system Digital personal information safe system Point and gift ticket issuing system Examination system

DESCRIPTION OF THE REFERENCE NUMERALS

1: service providing server group, 2: file server group, 3: administrator terminal, 4: user terminal

The invention claimed is:

1. An information processing system comprising:

a unit file generation unit configured to generate or update a personal blockchain containing a history of transactions of only a predetermined user in a plurality of users in a predetermined service as a block independently from the personal blockchain of the other users;

a finality transaction file generation unit configured to generate a finality transaction file containing a content of one of the transactions in which the predetermined user is involved for each of the transactions; and a management control unit configured to perform a control for storing and managing the personal blockchain of the predetermined user independently from the personal blockchain of the other users for each of the plurality of users in the predetermined service and managing the finality transaction file for each of the transactions separately from the personal blockchain, wherein the unit file generation unit is configured to generate a new personal blockchain of the predetermined user when the history of the transactions included in the personal blockchain of the predetermined user exceeds N and a (N+1)-th transaction is performed, the N being an integer of 1 or more, the management control unit is configured to perform a control for managing the new personal blockchain of the predetermined user while associating with the personal blockchain of the predetermined user, and the unit file generation unit is configured to generate the personal blockchain of a predetermined unit, the personal blockchain further containing a predetermined encryption matter in which a predetermined matter related to the predetermined unit is encrypted.

2. The information processing system according to claim 1, wherein the predetermined matter acquires a first encrypted predetermined matter encrypted by a first key, an encryption unit configured to generate a second encrypted predetermined matter formed by encrypting the first encrypted predetermined matter by a second key is further provided, the personal blockchain of the predetermined unit further containing the second encrypted predetermined matter is generated and stored, the first key is stored in an outside, and the second key is stored in an inside.

3. An information processing method executed by an information processing device, the information processing method comprising:

generating or updating a personal blockchain containing a history of transactions of only a predetermined user in a plurality of users in a predetermined service independently from the personal blockchain of the other users;

generating a finality transaction file containing a content of one of the transactions in which the predetermined user is involved for each of the transactions; and storing and managing the personal blockchain of the predetermined user independently from the personal blockchain of the other users for each of the plurality of users in the predetermined service and managing the finality transaction file for each of the transactions separately from the personal blockchain;

generating a new personal blockchain of the predetermined user as the unit file generation step when the history of the transactions included in the personal blockchain of the predetermined user exceeds N and a (N+1)-th transaction is performed, the N being an integer of 1 or more; and storing and managing the new personal blockchain of the predetermined user while associating with the personal blockchain of the predetermined user, wherein when generating the personal blockchain, the personal blockchain of a predetermined unit is generated, the personal blockchain further containing a predetermined encryption matter in which a predetermined matter related to the predetermined unit is encrypted.

4. A non-transitory computer readable medium having stored thereon a program for making a computer execute control processing including:

a unit file generation step for generating or updating a personal blockchain containing a history of transactions of only a predetermined user in a plurality of users in a predetermined service independently from the personal blockchain of the other users;

a finality transaction file generation step for generating a finality transaction file containing a content of one of the transactions in which the predetermined user is involved for each of the transactions; and a management control step for performing a control for storing and managing the personal blockchain of the predetermined user independently from the personal blockchain of the other users for each of the plurality of users in the predetermined service and managing the finality transaction file for each of the transactions separately from the personal blockchain, wherein a control for managing the new personal blockchain of the predetermined user while associating with the personal blockchain of the predetermined user, and in the unit file generation step, the personal blockchain of a predetermined unit is generated, the personal blockchain further containing a predetermined encryption matter in which a predetermined matter related to the predetermined unit is encrypted.

* * * * *